United States Patent
Op De Beeck

(10) Patent No.: US 8,467,522 B2
(45) Date of Patent: Jun. 18, 2013

(54) UNIVERSAL ISDN/POTS SPLITTER

(75) Inventor: Edmond Celina Jozef Op De Beeck, Mechelen (BE)

(73) Assignee: Alcatel Lucent, Paris (FR)

( * ) Notice: Subject to any disclaimer, the term of this patent is extended or adjusted under 35 U.S.C. 154(b) by 834 days.

(21) Appl. No.: 12/588,112

(22) Filed: Oct. 5, 2009

(65) Prior Publication Data

US 2010/0091979 A1   Apr. 15, 2010

(30) Foreign Application Priority Data

Oct. 10, 2008   (EP) .................................... 08290959

(51) Int. Cl.
*H04Q 1/28* (2006.01)
(52) U.S. Cl.
USPC .................. 379/413.02; 379/93.05
(58) Field of Classification Search
USPC ................ 379/93.05, 93.09, 387.01, 390.04, 379/399.08
See application file for complete search history.

(56) References Cited

U.S. PATENT DOCUMENTS

| | | | |
|---|---|---|---|
| 6,477,249 B1 * | 11/2002 | Williamson et al. | 379/399.01 |
| 6,748,076 B1 * | 6/2004 | Elo | 379/402 |
| 6,853,724 B2 * | 2/2005 | Wang | 379/387.02 |
| 2003/0031312 A1 * | 2/2003 | Elo | 379/387.01 |
| 2003/0048155 A1 * | 3/2003 | Heumann | 333/167 |
| 2004/0051616 A1 | 3/2004 | Kiko et al. | |
| 2008/0074178 A1 * | 3/2008 | Op De Beeck | 327/558 |
| 2008/0151929 A1 * | 6/2008 | Uhlemann | 370/463 |

FOREIGN PATENT DOCUMENTS

| | | |
|---|---|---|
| EP | 1 783 996 | 5/2007 |
| EP | 1 901 540 | 3/2008 |
| JP | 2004-15577 | 1/2004 |
| WO | WO 01/17203 | 3/2001 |
| WO | WO 2006/017236 | 2/2006 |

OTHER PUBLICATIONS

"Access network xDSL transmission filters; part 1: ADSL splitters for European deployment' Sub-part 4: Specification of ADSL over ISDN or POTS" universal splitters, ETSI TS 101 952-1-4, 2002, pp. 4-20.
A European Office Action dated Jun. 9, 2009.

* cited by examiner

*Primary Examiner* — Md S Elahee
*Assistant Examiner* — Akelaw Teshale
(74) *Attorney, Agent, or Firm* — Harness, Dickey & Pierce, P.L.C.

(57) ABSTRACT

A $7^{th}$ order splitter for replacing the known $9^{th}$ order splitter of an ISDN/POTS telecommunication system and reducing thereby the space occupied on the board as well as the cost. The $7^{th}$ order splitter comprising, between line terminals (Line+, Line−) and POTS/ISDN terminals, the cascade connection of a LC filter cell (L21a, L12b, C21) and several elliptical filter cells (L22a, L22b, C22, C24, C25; L23a, L23b, C23, C26, C27). One or more of these filter cells is associated with a damped series resonance circuit comprising a capacitor (C21; C22; C23) series coupled with an RL circuit (R21, L24; R22, L25; R23, L26) between two winding (L21a, L21b; L22a, L22b; L23a, L23b) of a symmetrical coil of the associated filter cell. Each RL circuit is constituted by the parallel coupling of a resistor (R21; R22; R23) and a coil (L24; L25; L26).

4 Claims, 4 Drawing Sheets

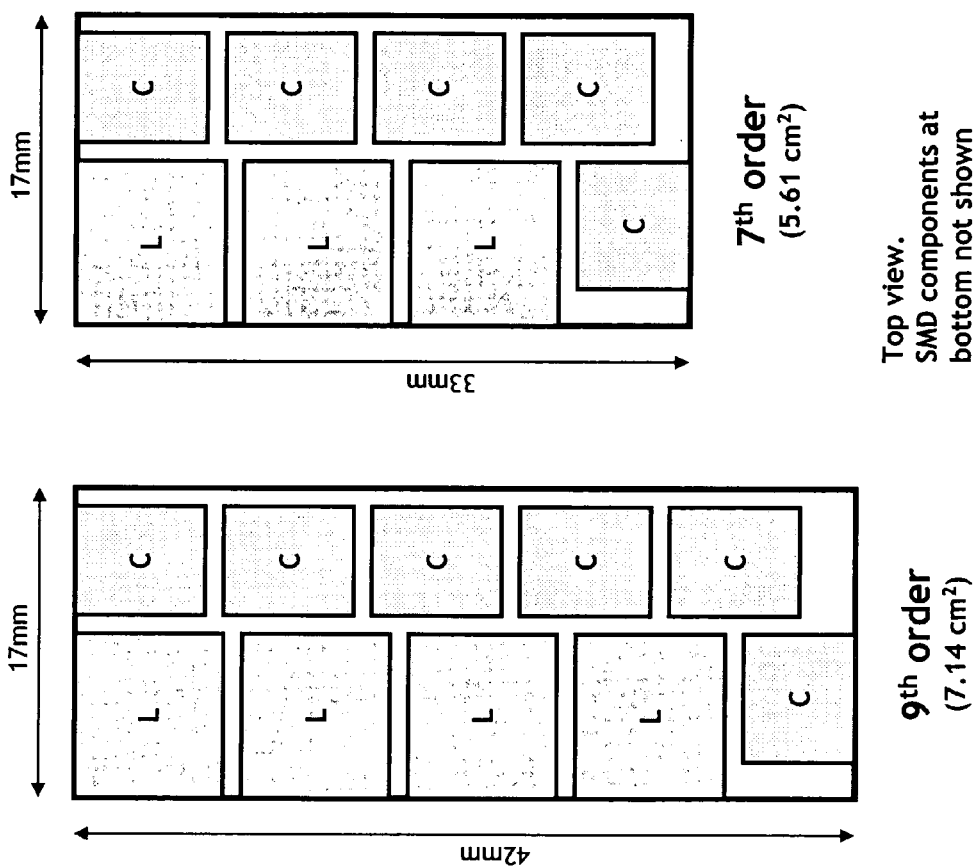

UNIVERSAL ISDN/POTS SPLITTER

The present invention relates to a splitter for an ISDN/POTS telecommunication system, said splitter having first and second line terminals and first and second POTS/ISDN terminals, and comprising the cascade connection of a LC filter cell and a plurality of elliptical filter cells, said LC filter cell comprising a first symmetrical coil having a first winding with a first terminal connected to said first line terminal and with a second terminal coupled to said first POTS/ISDN terminal via said plurality of elliptical filter cells, and having a second winding with a first terminal connected to said second line terminal and with a second terminal coupled to said second POTS/ISDN terminal via said plurality of elliptical filter cells, said LC filter cell further comprising a first capacitor coupled between the second terminal of the first winding of said first symmetrical coil and the second terminal of the second winding of said first symmetrical coil, each elliptical filter cell of said plurality comprising a second symmetrical coil having a first winding with a first terminal coupled to the second terminal of the first winding of said LC filter cell and with a second terminal coupled to said first POTS/ISDN terminal and having a second winding with a first terminal coupled to the second terminal of the second winding of said LC filter cell and with a second terminal coupled to said second POTS/ISDN terminal, each elliptical filter cell further comprising a second capacitor coupled between the second terminal of the first winding of the second symmetrical coil of said elliptical filter cell and the second terminal of the second winding of said second symmetrical coil, a third capacitor connected across the first winding of said second symmetrical coil and a fourth capacitor connected across the second winding of said second symmetrical coil.

Today's ISDN and Universal ISDN/POTS splitter circuits for xDSL are generally known in the art. These known splitters are based on $9^{th}$ order low pass filters, consisting of 4 coils and the related high voltage capacitors (typically 10 capacitors) as shown at FIG. 1.

This amount of large coils and capacitors per DSL line limits the integration of the number of splitter circuits per board (e.g. 72 ports per splitter board) and prevent the integration of a high number of DSL line terminations and splitter lines on a single board. As the number of coils and capacitors is high, not only the required space but also the cost of the known $9^{th}$ order ISDN splitter is relatively high.

Moreover, the known Universal ISDN/POTS splitter low pass filters have to be standard compliant (ETSI TS 101 952-1-4). In most cases, two different filters with a same topology but different component values are required to cover the 2 ISDN standards: 2B1Q and 4B3T.

An object of the present invention is to provide a splitter of the above known type but whereof the size and the cost are dramatically reduced while the splitter characteristics remain compliant to the ETSI standard ETSI TS 101 952-1-4, for 2B1Q and 4B3T ISDN standards.

According to the invention, this object is achieved due to the fact that said splitter comprises at least one RL circuit constituted by the parallel coupling of a resistor and a coil and connected in series with the second capacitor of an elliptical filter cell of said plurality of elliptical cells.

In this way, a $7^{th}$ order ISDN or Universal ISDN/POTS splitter low pass filter is provided for replacing the known $9^{th}$ order low pass filter. By eliminating 1 elliptical cell compared to the $9^{th}$ order splitter low pass filter, and by adding at least one RL circuit associated to another elliptical filter cell, a size reduction of 25% and a significant cost reduction is achieved.

This $7^{th}$ order filter is full ETSI standard compliant (ETSI TS 101 952-1-4) for both 2B1Q and 4B3T ISDN standards. The present splitter further shows comparable dynamic performance compared to the $9^{th}$ order splitter (transient rejection, noise impact on DSL signals, noise impact on ISDN signals).

It can further be proved that, with the present splitter, the xDSL stop-band attenuation characteristic, the ISDN passband return loss and insertion characteristic, both with and without ADSL impedance (Zadsl), and the POTS pass-band return loss and insertion loss characteristics for different impedances and conditions are similar to those of the known splitter.

Another characterizing embodiment of the present invention is that said splitter comprises another RL circuit constituted by the parallel coupling of a second resistor and a second coil and connected in series with the first capacitor of said LC filter cell between the second terminal of the first winding of said first symmetrical coil of said LC filter and the second terminal of the second winding of said first symmetrical coil of said LC filter.

By providing a RL circuit in the LC filter cell in addition to the one or more RL circuits associated to the elliptical filter cells, the performances of the splitter are increased.

In a preferred characterizing embodiment of the present invention, said splitter comprises the series connection of said LC filter cell, a first elliptical filter cell comprising a first second capacitor and a second elliptical filter cell comprising a second capacitor, the first second capacitor of said first elliptical filter cell is connected in series with a first RL circuit constituted by the parallel coupling of a first resistor and a first coil between the second terminal of the first winding of the second symmetrical coil of said first elliptical filter cell and the second terminal of the second winding of the second symmetrical coil of said first elliptical filter cell, and the second capacitor of said second elliptical filter cell is connected in series with a second RL circuit constituted by the parallel coupling of a second resistor and a second coil between the second terminal of the first winding of the second symmetrical coil of said second elliptical filter cell and the second terminal of the second winding of the second symmetrical coil of said second elliptical filter cell.

This arrangement constitutes the optimal splitter with respect to size, cost and standard compliance.

Further characterizing embodiments of the present a splitter for an ISDN/POTS telecommunication system are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

FIG. 4 shows a comparison between the space occupied by a prior art splitter with respect to the space occupied by the splitter of the present invention on a board.

Figure 1:
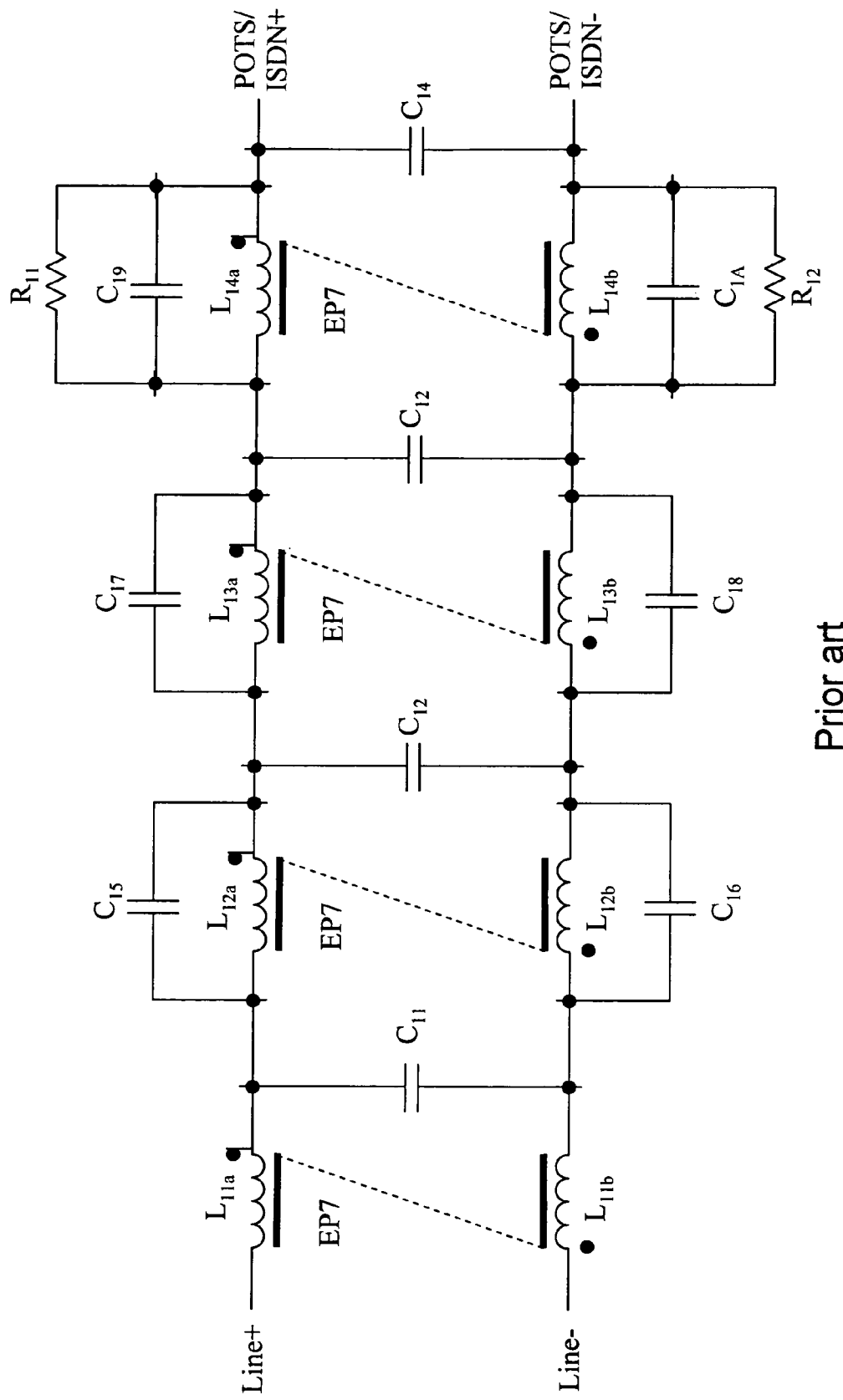
FIG. 1 shows a splitter for an ISDN/POTS telecommunication system as known from the prior art.

A splitter for an ISDN/POTS telecommunication system or more particularly the $9^{th}$ order low pass filter thereof as known from the prior art is shown at FIG. 1. This splitter has filter stages located between line terminals and POTS/ISDN terminals. An additional Common Mode Coil and protector for overvoltages may also be provided but are not shown at FIG. 1.

In more detail, the known splitter has a first line terminal Line+, a second line terminal Line−, a first POTS/ISDN terminal POTS/ISDN+ and a second POTS/ISDN terminal POTS/ISDN−. Between these line and POTS/ISDN terminals, the splitter comprises the cascade connection of a LC filter stage or cell L11a, L11b, C11 and three elliptical filter stages L12a, L12b, C12, C15, C16; L13a, L13b, C13, C17, C18; L14a, L14b, C14, C19, C1A, R11, R12.

The LC filter cell comprises a first symmetrical coil L11 constituted by the windings L11a and L11b. The first winding Lila has a first terminal connected to the first line terminal Line+ and a second terminal coupled to the first POTS/ISDN terminal POTS/ISDN+ through the elliptical filter stages, whilst the second winding L11b has a first terminal connected to the second line terminal Line− and a second terminal coupled to the second POTS/ISDN terminal POTS/ISDN− through the elliptical filter stages. The LC filter cell further comprises a first capacitor C11 coupled between the second terminal of its first winding Lila and the second terminal of its second winding L11b.

Each elliptical filter stage comprises a cell with a second symmetrical coil L12/L13/L14 respectively constituted by the windings L12a and L12b/L13a and L13b/L14a and L14b. The first winding L12a/L13a/L14a has a first terminal coupled to the second terminal of the first winding Lila of the above LC filter cell and a second terminal coupled to the first POTS/ISDN terminal POTS/ISDN+, whilst the second winding L12b/L13b/L14b has a first terminal coupled to the second terminal of the second winding L11b of the LC filter cell and a second terminal coupled to the second POTS/ISDN terminal POTS/ISDN−.

In more detail, the first terminal of the first winding L12a of the first elliptical filter stage is connected to the second terminal of the first winding L11a of the LC filter cell and the first terminal of the second winding L12b of the first elliptical filter stage is connected to the second terminal of the second winding L11b of the LC filter cell.

The first terminal of the first winding L13a of the second elliptical filter stage is connected to the second terminal of the first winding L12a of the first elliptical filter stage and the first terminal of the second winding L13b of the second elliptical filter stage is connected to the second terminal of the second winding L12b of the first elliptical filter stage.

The first terminal of the first winding L14a of the third elliptical filter stage is connected to the second terminal of the first winding L13a of the second elliptical filter stage and the first terminal of the second winding L14b of the third elliptical filter stage is connected to the second terminal of the second winding L13b of the second elliptical filter stage.

Finally, the second terminal of the first winding L14a of the third elliptical filter stage is connected to the first POTS/ISDN terminal POTS/ISDN+, and the second terminal of the second winding L14b of the third elliptical filter stage is connected to the second POTS/ISDN terminal POTS/ISDN−.

The 4 symmetrical coils L11 to L14, each with 2 windings (a and b) are typical RM4 or EP7 size coils.

Each elliptical filter cell further comprises a second capacitor C12/C13/C14 coupled between the second terminal of the first winding L12a/L13a/L14a of the second symmetrical coil and the second terminal of the second winding L12b/L13b/L14b of the second symmetrical coil, a third capacitor C15/C17/C19 connected across the respective first winding L12a/L13a/L14a of the second symmetrical coil and a fourth capacitor C16/C18/C1A connected across the second winding L2b/L3b/L4b of the second symmetrical coil.

Finally, in some cases, additional resistors are placed in series or in parallel with some of the capacitors for additional damping of the LC filter stages. For instance, the last elliptical filter cell L14, C19, C1A may have a resistor R11 connected in parallel across the third capacitor C19 and another resistor R12 connected in parallel across the fourth capacitor C1A.

Figure 2:
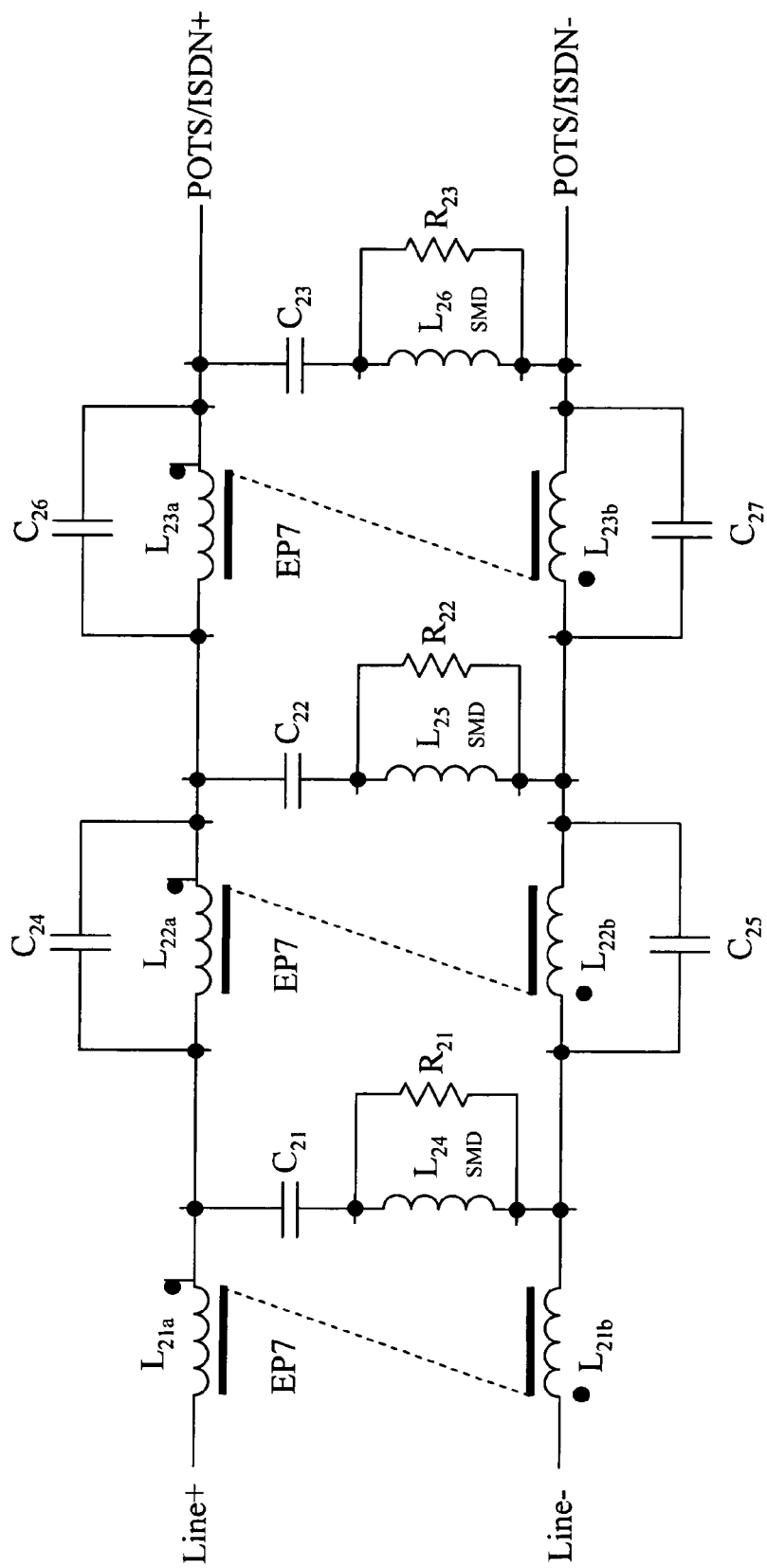
FIG. 2 shows a splitter according to the invention.
Figure 3:
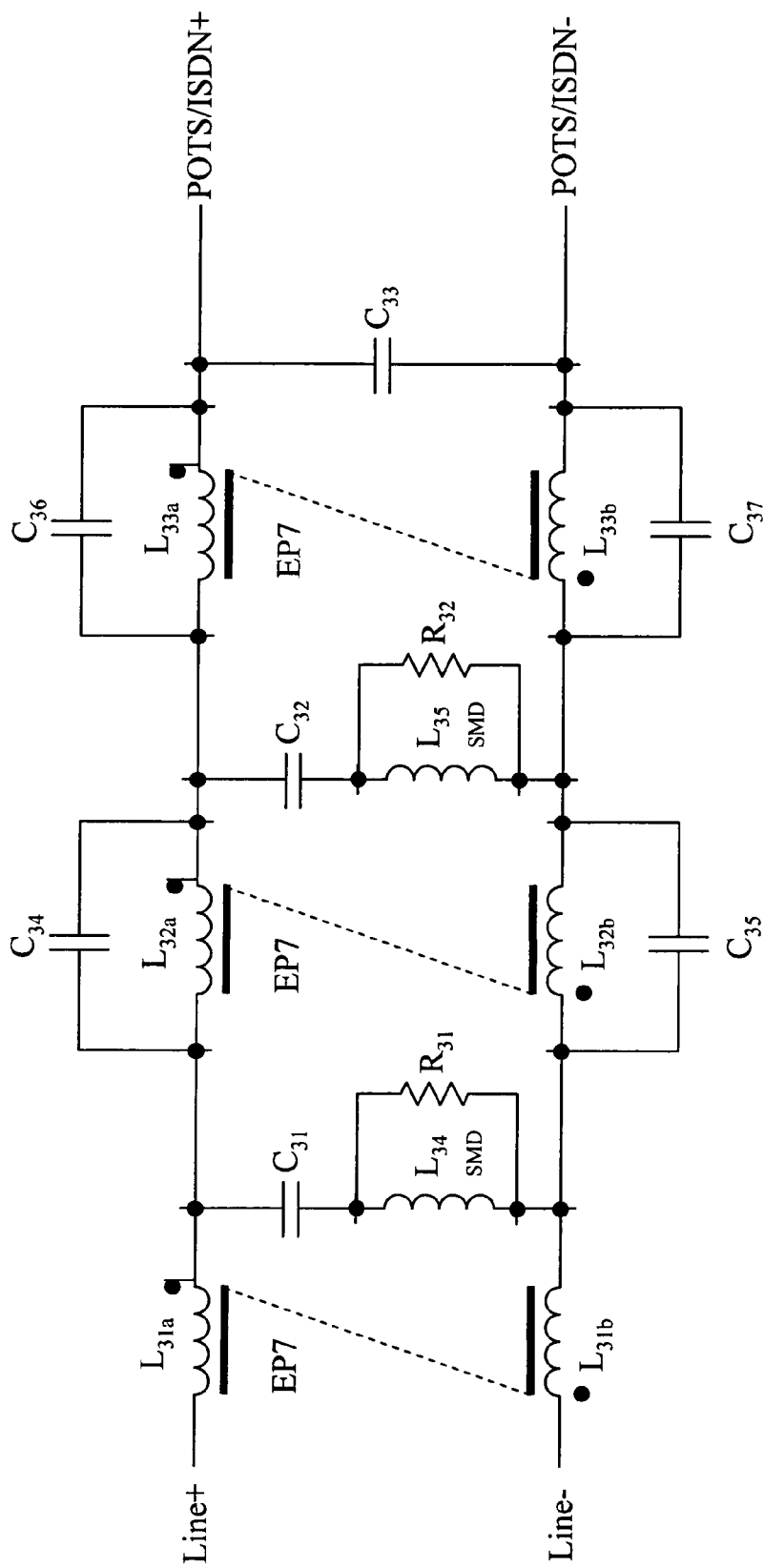
FIG. 3 shows a variant of the splitter of FIG. 1.

The main idea of the present invention is to reduce the area occupied by the splitter on a board by replacing the $9^{th}$ order ISDN or Universal ISDN/POTS splitter low pass filter, known from the prior art and shown at FIG. 1, by a $7^{th}$ order low pass filter as shown at FIG. 2 or FIG. 3.

In the splitter according to the invention and shown at FIG. 2, this replacement is achieved by eliminating 1 elliptical filter stage, i.e. 1 symmetrical coil RM4 or EP7 type and 3 high voltage capacitors, and by adding 3 small, low cost SMD (Surface Mounted Devices) coils and resistors, as additional series resonance circuits.

By carefully designing this $7^{th}$ order filter and dimensioning the component values, the following is achieved:

full ETSI standard compliance of the $7^{th}$ order filter (ETSI TS 101 952-1-4), for both 2B1Q and 4B3T ISDN standards, by 1 single filter implementation;

comparable dynamic performance compared to the $9^{th}$ order splitter with respect to transient rejection, noise impact on DSL signals, noise impact on ISDN signals; and smaller size (up to 25% smaller) and lower cost.

A $7^{th}$ order ISDN or Universal ISDN/POTS splitter low pass filter, consisting of 1 LC filter stage, 2 elliptical filter stages and 3 series resonance circuits is schematically represented at FIG. 2.

Between the line terminals Line+ and Line− and the POTS/ISDN terminals POTS/ISDN+ and POTS/ISDN−, the $7^{th}$ order splitter comprises the cascade connection of a LC filter stage L21a, L21b, C21, R21, L24, a first elliptical filter stage L22a, L22b, C24, C25, C22, R22, L25 and a second elliptical filter stage L23a, L23b, C26, C27, C23, R23, L26.

In more detail, the line terminal Line+ is coupled to the POTS/ISDN terminal POTS/ISDN+ via the series connection of a first winding L21a of a first symmetrical coil L21 of the LC filter cell, a first winding L22a of a second symmetrical coil L22 of the first elliptical filter cell, and a first winding L23a of a third symmetrical coil L23 of the second elliptical filter cell.

On the other hand, the line terminal Line− is coupled to the POTS/ISDN terminal POTS/ISDN− via the series connection of a second winding L21b of the first symmetrical coil L21 of the LC filter cell, a second winding L22b of the second symmetrical coil L22 of the first elliptical filter cell, and a second winding L23b of the third symmetrical coil L23 of the second elliptical filter cell.

The LC filter stage is completed by adding a first damped series resonance circuit to the LC filter cell. This first resonance circuit is constituted by a first capacitor C21 series connected with the parallel connection of a first resistor R21 and a first coil L24. The first resonance circuit is connected between the junction point of the first winding L21a of the first symmetrical coil L21 of the LC filter cell with the first winding L22a of the second symmetrical coil L22 of the first elliptical filter cell and the junction point of the second winding L21b of the first symmetrical coil L21 of the LC filter cell with the second winding L22b of the second symmetrical coil L22 of the first elliptical filter cell.

The first elliptical filter stage is completed by adding a second damped series resonance circuit to the first elliptical filter cell. This second resonance circuit is constituted by a second capacitor C22 series connected with the parallel connection of a second resistor R22 and a second coil L25. The second resonance circuit is connected between the junction point of the first winding L22a of the second symmetrical coil L22 of the first elliptical filter cell with the first winding L23a of the third symmetrical coil L23 of the second elliptical filter cell and the junction point of the second winding L22b of the second symmetrical coil L22 of the first elliptical filter cell with the second winding L23b of the third symmetrical coil L23 of the second elliptical filter cell.

The second elliptical filter stage is completed by adding a third damped series resonance circuit to the second elliptical filter cell. This third resonance circuit is constituted by a third capacitor C23 series connected with the parallel connection of a third resistor R23 and a third coil L26. The third resonance circuit is connected between the junction point of the first winding L23a of the third symmetrical coil L23 of the second elliptical filter cell with the POTS/ISDN terminal POTS/ISDN+ and the junction point of the second winding L23b of the third symmetrical coil L23 of the second elliptical filter cell with the POTS/ISDN terminal POTS/ISDN−.

A fourth capacitor C24 is provided in parallel across the first winding L22a of the second symmetrical coil L22 of the first elliptical filter cell, and a fifth capacitor C25 is provided in parallel across the second winding L22b of this second symmetrical coil L22.

Similarly, a sixth capacitor C26 is provided in parallel across the first winding L23a of the third symmetrical coil L23 of the second elliptical filter cell, and a seventh capacitor C27 is provided in parallel across the second winding L23b of this third symmetrical coil L23.

Damping resistors (not shown) may be provided in series or in parallel with the fourth C24, fifth C25, sixth C26 and/or seventh C27 capacitors.

An additional Common Mode Coil and protector for overvoltages may also be provided but are not shown at FIG. 2.

It is to be noted that the symmetrical coils L21, L22 and L23, each with first (a) and second (b) windings, are typically of the type EP7 or RM4.

The coils L24, L25 and L26 are small Surface Mounted SMD type coils, of low values, e.g. a few µH. As there is no DC current going through these coils, the size and cost of the coils is relatively small.

The resistors R21, R22, R23 are low-ohmic Surface Mounted SMD type of resistors, also of small size, as no DC current is flowing through these resistors.

The architecture of the low pass filter of this $7^{th}$ order ISDN/Universal splitter results in characteristics that are similar to those of the above known $9^{th}$ order filter.

An optimized variant of the $7^{th}$ order ISDN or Universal ISDN/POTS splitter low pass filter is shown at FIG. 3. This splitter consists of 1 LC filter stage, 2 elliptical filter stages and 2 series resonance circuits.

In this more optimized embodiment of the $7^{th}$ order ISDN or ISDN/POTS Universal splitter, only 2 series resonance circuits C31, R31, L34 and C32, R32, L35 are used. In other words, with respect to the embodiment shown at FIG. 2, the second elliptical filter cell is no longer associated with the third damped series resonance circuit comprising the third capacitor C23 series connected with the parallel connection of the third resistor R23 and the third coil L26, but only with third capacitor C33 as shown at FIG. 3. This third capacitor C33 is thus directly connected between the junction point of the first winding L33a of the third symmetrical coil L33 of the second elliptical filter cell with the POTS/ISDN terminal POTS/ISDN+ and the junction point of the second winding L33b of the third symmetrical coil L33 of the second elliptical filter cell with the POTS/ISDN terminal POTS/ISDN−.

By correct dimensioning the component values, also with this filter shown at FIG. 3, full compliancy to ETSI standard ETSI TS 101 952-1-4 is guaranteed and a dynamic performance (transient rejection, noise impact of ISDN on xDSL signals, noise impact of xDSL on ISDN signals), comparable to the known $9^{th}$ order splitter is achieved.

Compared to the embodiment shown at FIG. 2, this more optimized embodiment shown at FIG. 3 requires even less space and has a better cost advantage.

FIG. 4 shows the size comparison of the $7^{th}$ order splitter (right: 33 mm×17 mm=5.61 cm$^2$) versus the $9^{th}$ order splitter (left: 42 mm×17 mm=7.14 cm$^2$) showing more than 25% size reduction with the $7^{th}$ order splitter. Only the top side components are shown at FIG. 4, not the SMD components at the bottom side, L representing coils and C representing capacitors.

It is to be noted that other implementation of the $7^{th}$ order ISDN or ISDN/POTS/Universal splitter low pass filter, with e.g. series resistors for the elliptical caps, other positions of series resonance circuits, etc. may be derived from the basic architectures shown at FIG. 2 and FIG. 3.

Derived implementations of the $7^{th}$ order ISDN/POTS Universal splitter low pass filter are for instance:
  implementations with 1, 2 or 3 series resonance circuits;
  different positions for 1 or 2 series resonance circuits, e.g. together with C31, C32 or C33 in case of 1 series resonance circuit, together with C31 and C32 (as shown at FIG. 3), C31 and C33 or C32 and C33 in case of 2 series resonance circuits; and
  use of series or parallel damping resistors on the fourth C24, fifth C25, sixth C26 and/or seventh C27 capacitors as mentioned above with respect to FIG. 2.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A splitter for at least one of POTS and ISDN (POTS/ISDN) telecommunication system, said splitter having first and second line terminals and first and second POTS/ISDN terminals, and comprising a cascade connection of a LC filter cell and a plurality of elliptical filter cells,
  said LC filter cell comprising a first symmetrical coil having a first winding and a second winding, said first winding having a first terminal connected to said first line terminal and a second terminal coupled to said first POTS/ISDN terminal via said plurality of elliptical filter cells, said second winding having a first terminal connected to said second line terminal and a second terminal coupled to said second POTS/ISDN terminal via said plurality of elliptical filter cells, said LC filter cell further comprising a first capacitor connected to the second terminal of the first winding of said first symmetrical coil at a first terminal of the first capacitor and coupled to the second terminal of the second winding of said first symmetrical coil via a first RL circuit constituted by a parallel connection of a first resistor and a first coil, the first RL circuit connected in series with the first capacitor at a second terminal of the first capacitor, each elliptical filter cell of said plurality of elliptical filter cells comprising a second symmetrical coil having a third winding and a fourth winding, said third winding having a first terminal coupled to the second terminal of the first winding of said LC filter cell via at least one of a first direct connection or said plurality of elliptical filters and a second terminal coupled to said first POTS/ISDN terminal via at least one of a second direct connection or said plurality of elliptical filters, said fourth winding having a first terminal coupled to the second terminal of the second winding of said LC filter cell via at least one of a third direct connection or said plurality of elliptical filters and with a second terminal coupled to said second POTS/ISDN via at least one of a fourth direct connection or said plurality of elliptical filters, each elliptical filter cell further comprising a second capacitor, a third capacitor, and a fourth capacitor, said second capacitor connected, at a first terminal of the second capacitor, to the second terminal of the third winding of the second symmetrical coil of said elliptical filter cell and coupled to the second terminal of the fourth winding of said second symmetrical coil, said third capacitor connected across the third winding of said second symmetrical coil and said fourth capacitor connected across the fourth winding of said second symmetrical coil, wherein the second capacitor is coupled to the second terminal of the fourth winding of said second symmetrical coil via a second RL circuit constituted by a parallel connection of a second resistor and a second coil, the second RL circuit connected in series with the second capacitor at a second terminal of the second capacitor.

2. The splitter according to claim 1, wherein said splitter comprises a cascade connection of said LC filter cell and two elliptical filter cells.

3. The splitter according to claim 1, wherein said splitter further comprises a first damping resistor connected in parallel with the third capacitor across the third winding of said second symmetrical coil of said elliptical filter cell, and a second damping resistor connected in parallel with the fourth capacitor across the fourth winding of said second symmetrical coil.

4. The splitter according to claim 1, wherein said splitter further comprises a third damping resistor connected in series with the third capacitor across the third winding of said second symmetrical coil of said elliptical filter cell, and a fourth damping resistor connected in series with the fourth capacitor across the fourth winding of said second symmetrical coil.

* * * * *